United States Patent
Verbovszky et al.

(10) Patent No.: US 6,341,818 B1
(45) Date of Patent: Jan. 29, 2002

(54) CHILD'S CAR SEAT INSERT

(76) Inventors: Esther A. L. Verbovszky, 325 N. Falmouth Dr., Rocky River, OH (US) 44116; Carl J. Myers, 7816 Little Mountain Rd., Mentor, OH (US) 44060

( * ) Notice: Subject to any disclaimer, the term of this patent is extended or adjusted under 35 U.S.C. 154(b) by 0 days.

(21) Appl. No.: 09/515,164

(22) Filed: Feb. 29, 2000

(51) Int. Cl.[7] ............................................. A47C 31/00
(52) U.S. Cl. ................................................ 297/219.12
(58) Field of Search .................... 297/250.1, 219.12, 297/230.13, 256.15, 452.41, 488, 467, 284.5, 284.6, 325, 327, 377, 130

(56) References Cited

U.S. PATENT DOCUMENTS

| | | | |
|---|---|---|---|
| 3,596,986 A | * | 8/1971 | Ragsdale |
| 4,383,713 A | * | 5/1983 | Roston |
| 4,653,809 A | * | 3/1987 | Czernakowksi et al. |
| 4,775,183 A | * | 10/1988 | Tsuge et al. |
| 4,793,651 A | * | 12/1988 | Inagaki et al. |
| 5,056,533 A | * | 10/1991 | Solano |
| 5,127,120 A | * | 7/1992 | Mason |
| 5,265,931 A | * | 11/1993 | Ryan |
| 5,310,245 A | * | 5/1994 | Lyszczasz |
| 5,482,352 A | * | 1/1996 | Leal et al. |
| 5,551,749 A | * | 9/1996 | Reher et al. |
| 5,833,309 A | * | 11/1998 | Schmitz |
| 5,842,739 A | | 12/1998 | Noble |
| 5,916,089 A | * | 6/1999 | Ive |
| 5,988,744 A | * | 11/1999 | Franchak |
| 6,036,263 A | * | 3/2000 | Gold |
| 6,142,565 A | * | 11/2000 | Rieder |

* cited by examiner

Primary Examiner—Milton Nelson, Jr.
(74) Attorney, Agent, or Firm—Tarolli, Sundheim, Covell, Tummino & Szaob L.L.P.

(57) ABSTRACT

An insert for a child's car seat comprising a cushioning positioner received within a child's car seat such that the cushioning positioner secures a child of any size in the car seat in a physiologically and physically beneficial orientation and protects the child from injury due to the operation of the car. The insert comprises a base with a child placement area therein and a restraint having a pivot and a securing end. The restraint is pivotally attached to the base at the pivot such that when the restraint is pivoted away from the base, a child can be placed into the child placement area and when the restraint is pivoted toward the base it releasably attaches at the securing end to the base.

8 Claims, 4 Drawing Sheets

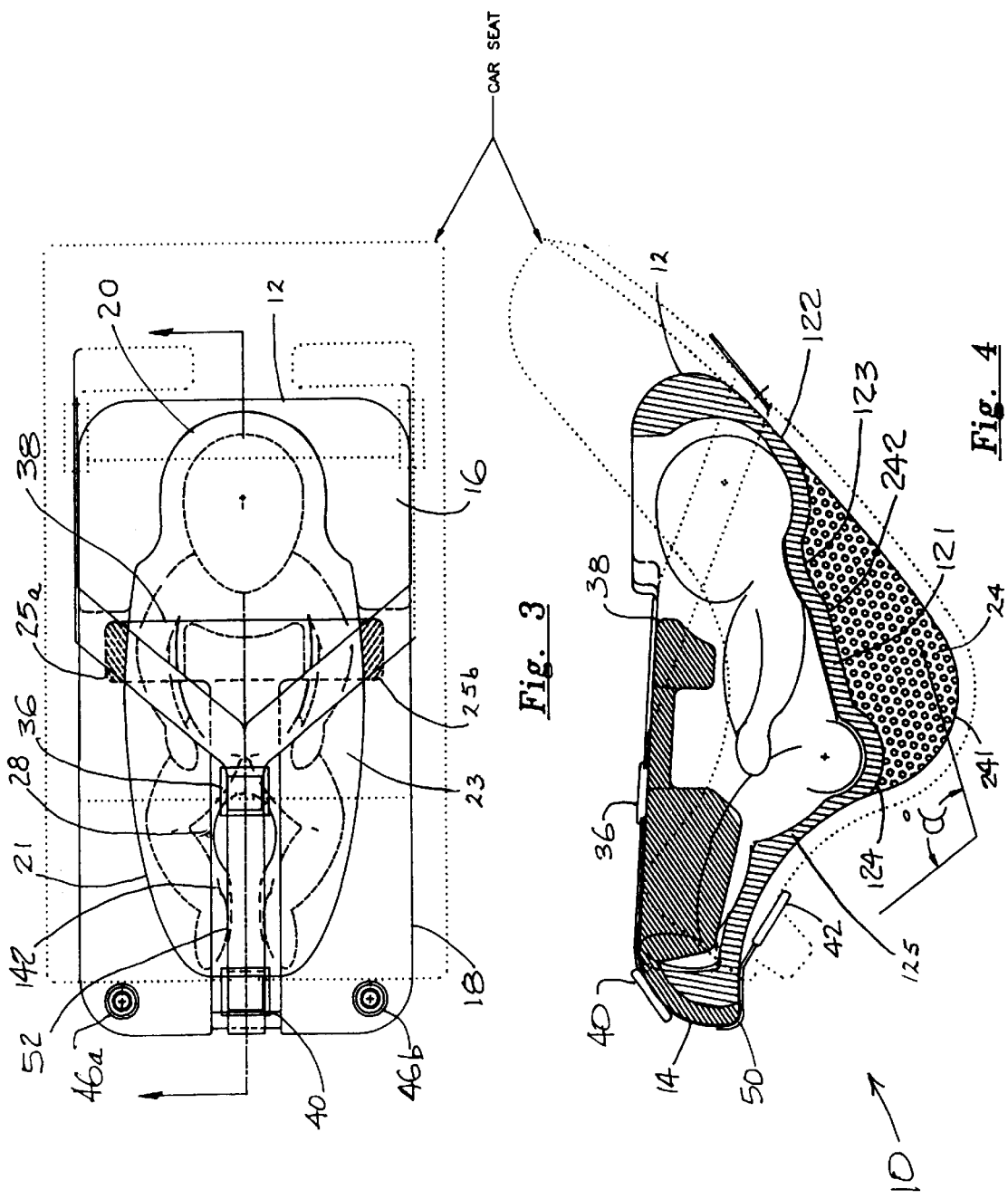

CHILD'S CAR SEAT INSERT

BACKGROUND OF THE INVENTION

1. Field of the Invention

The present invention relates, generally, to children's car seats and, more particularly, to inserts for children's car seats to provide improved support for the child, especially for infants and newborns.

2. Description of Related Art

All states require that children be restrained in an appropriate car seat while in an operating vehicle. While the states differ on the exact maximum child size and age requirement, they all have laws that are designed to protect children until they are old or big enough so that only seat belts provide appropriate safety. This is especially important for newborns just being discharged from the hospital after birth. Child car seat manufacturers have developed standard types and sizes of car seats to assure parents that not only are their children safe but that they are compliant with the laws of the States. Unfortunately, these standardized child car seats cannot accommodate newborns or very small infants, including premature newborns and prematurely discharged newborns weighing 2 kg. or less.

This creates a problem for the parents in transporting the child. This problem affects not only the comfort of the child but also his or her safety and health. Studies have shown that premature infants have significant decreases in oxygen saturation while restrained in a car seat with 30% experiencing hypoxia, bradycardia, sleep apnea or some combination of those conditions. The decrease in oxygen saturation is directly related to the degree to which the infant is reclining in the car seat; the more upright the infant, the greater the physiological risk, the more supine, the lesser the risk. This occurs because the more upright the infant, the greater the tendency for the infant to slouch or slump, either forward or sideways, thereby resulting in airway obstruction in the infant. Infant slouching or slumping occurs for two basic reasons, low birth weight infants cannot resist the gravitational effects if their bodies are in a too upright position, and standard sized child car seats do not provide the necessary support and orientation for these infants to prevent the gravitational effects. These effects can cause secondary slumping since most infants do not have the physical maturation of the back to maintain an upright position.

To counteract this effect, parents and other caregivers have resorted to rolling up towels, blankets, etc. and wedging them into the space between the infant and the child car seat. Although this method may provide a remedy for the problem, it does not secure the child in the event of an accident or other sudden operation of the automobile.

U.S. Pat. No. 5,735,576 to Pepys, et al discloses a head support device for a child's car seat. The Pepys, et al device is a flexible, folding support that does not provide the necessary full body cushioning and support for children of any size. Basic Comfort, Inc. provides a similar type of head support insertable in a car seat. This device also provides a head and body support but without the necessary cushioning to prevent slouching or slumping.

Accordingly, there exists a need for a child's car seat insert that provides a cushioning positioner and secures the child in the car seat when the child is too small for the car seat. The cushioning positioner should secure the child in a physiologically and physically beneficial orientation and protect the child from injury.

BRIEF SUMMARY OF THE INVENTION

The present invention provides a child's car seat insert that satisfies the aforementioned need.

Accordingly, it is an object of the present invention to provide a cushioning positioner that inserts into any standard child's car seat.

It is another object of the present invention to provide a cushioning positioner that will secure any size child, but especially newborns and infants, including those weighing less than 2 kg, in a physiologically and physically beneficial position while in a car seat.

It is yet another object of the present invention to provide a cushioning positioner that has a cradle angle such that the child is positioned at a proper incline to prevent slumping and slouching while in the car seat.

It is yet another object of the present invention to provide a cushioning positioner that is manufactured from cushioning media to provide comfort, support and security to the child while in the car seat.

It is yet another object of the present invention to provide a cushioning positioner that is comprised of inflatable chambers.

Accordingly, the present invention relates to an insert for a child's car seat, comprising: a cushioning positioner secured into a child's car seat such that the cushioning positioner secures a child of any size in the car seat in a physiologically and physically beneficial orientation and protects the child from injury.

In another aspect, the present invention relates to an insert for a child's car seat comprising a base with child placement area therein; and a restraint having a pivot and a securing end that is pivotally attached to the base such that when the restraint is pivoted away from the base, a child can be placed into the child placement area and when the restraint is pivoted toward the base it releasably attaches at the securing end to the base.

In yet another aspect, the present invention relates to an insert for a child's car seat comprising a base having a bed and forming a cushioning positioner such that the cushioning positioner secures a child of any size in the car seat in a physiologically and physically beneficial orientation and protects the child from injury due to the operation of the car.

BRIEF DESCRIPTION OF THE SEVERAL VIEWS OF THE DRAWINGS

Further features of the present invention will become apparent to those skilled in the art to which the present invention relates from reading the following specification with reference to the accompanying drawings in which:

FIG. 3 is top a plan view of the present invention inserted in a child's car seat.

FIG. 4 is a cross-sectional view of the present invention taken along section-indicating lines 4—4 in FIG. 3.

DETAILED DESCRIPTION OF THE INVENTION

The present invention is a child's car seat insert comprising a cushioning positioner 10. The cushioning positioner 10 is received within a child's car seat and can secure a child of any size, including infants and newborns, in the car seat in a physiologically and physically beneficial orientation, whether reclined or semi-upright, and protects the child from injury especially injury that may result from the operation of the car. The cushioning positioner 10 secures infants and newborns weighing less than about 2 kg. and who do not appropriately fit into standard sized car seats.

Figure 1:
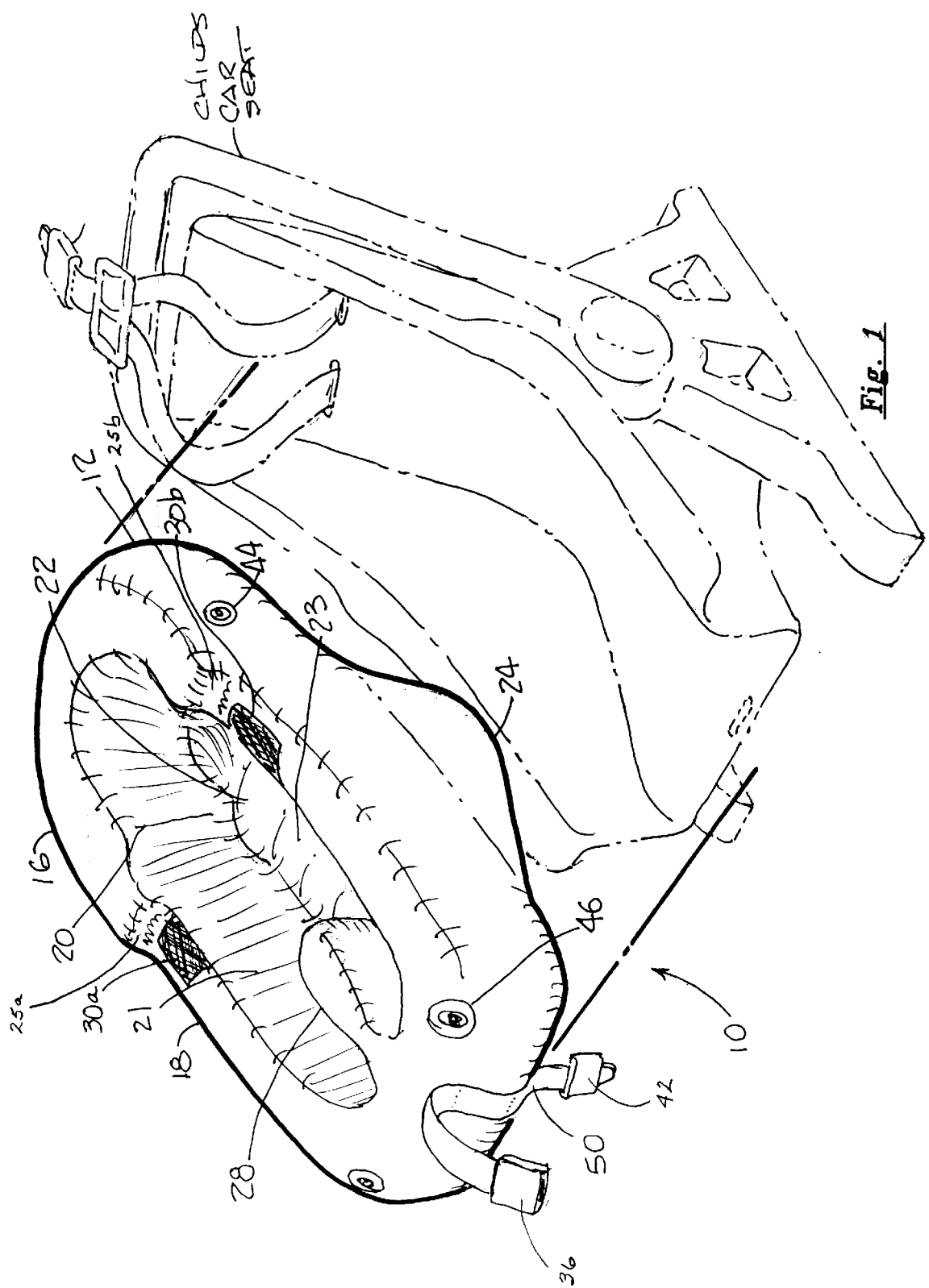
FIG. 1 is a perspective view of the present invention shown inserted in a child's car seat.

Referring now to the drawings and, more particularly, to FIG. 1, there is shown a perspective view of the present invention. The cushioning positioner 10 has a base 12 with bed 22. Head wall 20 and trunk wall 21 extend around the perimeter of bed 22 at the head section 16 and trunk section 18, respectively, thereby defining a child placement area 23. Head wall 20 extends more than does trunk wall 21 thereby forming steps 25a and 25b on opposite points of the perimeter of bed 22. Securing member attachments 30a and 30b and belt clips (not shown) are located on trunk wall 21 at the steps 25a and 25b. Pommel 28 extends from the trunk section 18 of the base 12. When the cushioning positioner 10 is inserted in a child's car seat and a child placed therein, the car seat straps are routed through the belt clips (not shown) and pass over the pommel 28 and latch into the car seat buckle thereby securing the child. In the event the car seat straps are not long enough to reach the car seat buckle, harness 50, terminated at one end with a harness buckle 36 and on the other with a harness latch plate 42 and having a harness adjuster (not shown), can be used. Harness 50 is attached to the base 12. Harness buckle 36 is sized to accept the latch plate of standard car seat shoulder straps; and harness latch plate 42 is sized to fit and lock into a standard car seat buckle. The harness adjuster(not shown) is used to adjust the overall length of the harness 50.

Figure 2:
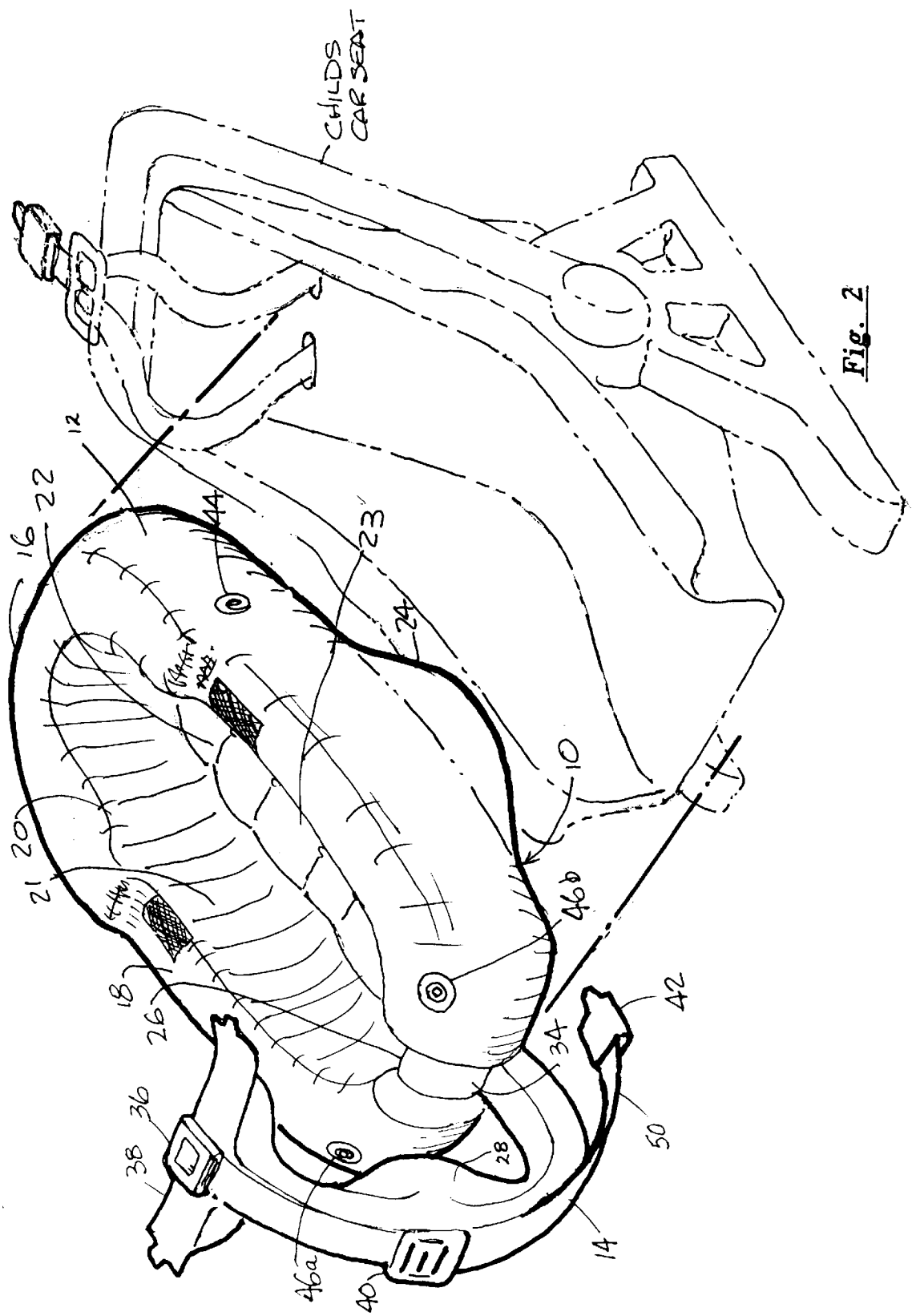
FIG. 2 is another perspective view of the present invention shown inserted in a child's car seat.

Referring now to FIG. 2, there is shown another perspective view of the present invention. In FIG. 2, the cushioning positioner 10 of FIG. 1 is provided with a restraint 14. Pommel 28 is attached to the restraint 14 instead of being attached to the trunk section 18 of base 12, as in FIG. 1. Trunk section 18, however, now has a restraint notch 26 formed therein to receive and locate the restraint 14. Securing member 38 extends from the securing end of the restraint 14 and at right angles thereto forming a tee bar configuration therewith. Restraint 14 is pivotally attached to the base 12 at trunk section 18 by pivot 34. Pivot 34 can be any material that provides a pivoting movement, and may be a flexible member or strap releasably attached to the restraint 14 and base 12 such that restraint 14 can be completely separated from base 12. Harness 50, terminated at one end with a harness buckle 36 and on the other with a harness latch plate 42 and having a harness adjuster 40, is attached to the restraint 14. Harness adjuster 40 is attached between the harness buckle 36 and harness latch plate 42. Harness buckle 36 is sized to accept the latch plate of standard car seat shoulder straps, and harness latch plate 42 is sized to fit and lock into a standard car seat buckle. Harness adjuster 40 is used to adjust the overall length of the harness 50. Pivot 34 allows the restraint 14 to move toward or away from the bed 22. Back support 24 attaches to and extends from the base 12. With the restraint 14 pivoted away from the base 12, a child can be placed into the cushioning positioner 10. The restraint 14 is then pivoted toward the bed 22 until the securing member 38 comes in contact with the trunk wall 21 at the securing patches 30a and 30b. The car seat straps are routed through the belt clips (not shown) and the car seat latch plate is inserted into the harness buckle 36. Harness latch plate 42 is inserted into the car seat buckle at the bottom of the car seat. Harness adjuster 40 is then manipulated to assure that the harness 50 and the car seat belts are tight to provide a secure fit of the cushioning positioner 10 in the car seat. When the restraint 14 is pivoted toward the bed 22, it locates and is detained in restraint notch 26.

Referring now to FIG. 3, there is shown a top plan view of the cushioning positioner 10 in a car seat with a child placed therein. The head wall 20 provides cushioning support for the child's head and assures that it is kept in proper lateral alignment. The trunk wall 21 provides cushioning support for the child's body, arms and legs and assures that the arms and legs are laterally restrained and that the body is kept in proper lateral alignment. Pommel 28, whether attached to the trunk section 18, as shown in FIG. 1, or to the restraint 14, as shown in FIG. 2, is located between the child's legs thereby providing support for the child's body and assisting in keeping the body in proper position preventing slumping while in the cushioning positioner 10. The restraint 14 assures that the child is restrained in the child placement area 23 preventing slumping and slouching.

Referring now to FIG. 4, there is shown a cross-sectional view taken along section-indicating lines 4—4 in FIG. 3. Back support 24 is received within the base of the car seat and is positioned adjacent the crease area where the back and the base of the car seat meet. At this point the back and the base of the car seat form a certain base angle α. The back support 24 is made of flexible resilient material so that it fits securely into the car seat assuming the base angle α on its lower plane 241. The top surface 242 of the back support 24 is releasably attached to the base bottom 121. When inserted in the car seat, the base bottom 121 forms a cradle angle β independent of base angle α. Cradle angle β is larger than base angle α such that the cushioning positioner 10 places the child's body in a less inclined (i.e., more supine) orientation. This is especially important for infants and newborns since their musculature is not developed sufficiently to withstand the force of gravity which would cause slouching and slumping if subjected to base angle α. The base bottom 121 is contoured to have a head support 122, neck support 123, buttocks support 124 and legs support 125 to assure contact with those areas and to provide a positive support thereat. The cradle angle β along with back support 24, head support 122, neck support 123 and buttocks support 124 provides a physiologically and physically beneficial position for newborns or other small infants, especially those weighing less than about 2 kg. and who do not appropriately fit into standard sized child's car seats.

The cushioning positioner 10 is manufactured of cushioning media, such as cotton, foam rubber, foam vinyl, air, water, etc., or any combination thereof, covered with a suitable skin manufactured of plastic, nylon or any suitable material. For example, the cushioning positioner can have a skin manufactured with a nylon facing and a backing of 65/35% combination of polyester/cotton. Also, the skin can be manufactured to be washable either, in-place or after removal from the cushioning media. The cushioning positioner 10 can be comprised of discrete chambers, especially in the event the cushioning media includes a fluid, like air or water, either solely or in combination with other types of cushioning media. For example, the head section 16, trunk section 18 and back support 24 can be made of discrete chambers with separations therebetween (not shown). In that case, inflation valves for each discrete chamber are included in the design. Referring again to FIGS. 1 and 2, there is shown three inflation valves, head valve 44 which allows for inflation of the head section 16 and first and second trunk valves 46a and 46b which allow inflation of the trunk section 18. The inflation valves can be Halkey-Roberts 420-ACC Presto-Seal valves or any suitable valve dependent upon the inflating media, as one of ordinary skill in the art understands and appreciates. The inflation valves inflate their respective chambers to a level as necessary to provide appropriate security and positioning for the child based upon the size of the child and the type of car seat. The cushioning positioner 10 can be inflated by mouth or by using a regular hand pump or other type of pump. The inflation is gauged such that the child placement area 23 comfortably accepts the child while providing a snug fit around the child preventing any lateral shifting, slumping or slouching. The base bottom 121 is made of slightly more rigid, but still flexible and resilient, material to provide support for the cushioning media of the rest of the base 12 and to allow for the contouring necessary to form the head support 122, neck support 123 buttocks support 124, and legs support 125.

Figure 5:
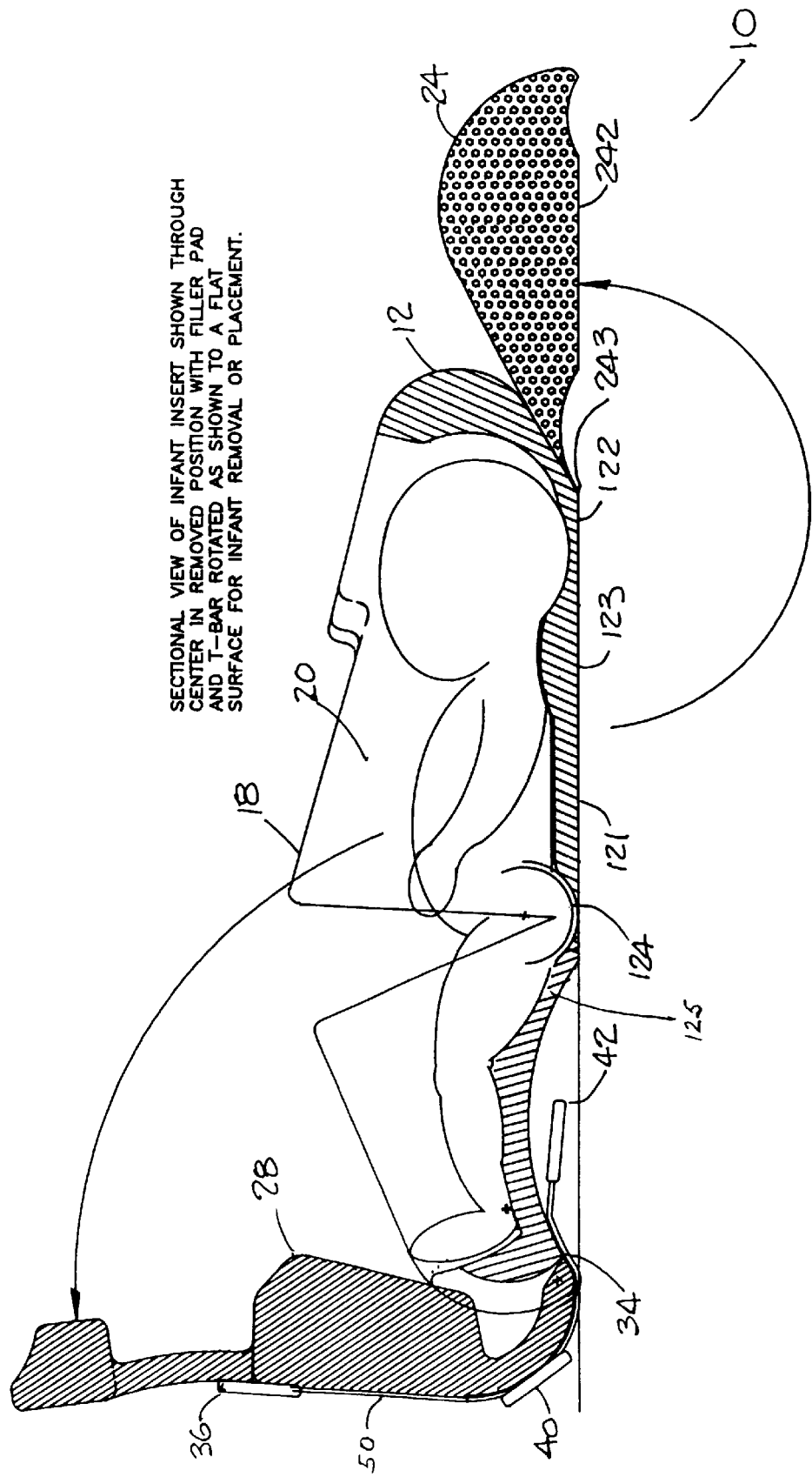
FIG. 5 is a cross-sectional view of the present invention taken along its longitudinal axis and shown outside the child's car seat and on a flat horizontal surface.

Referring now to FIG. 5, there is shown a cross-sectional view of the cushioning positioner 10 taken along its longitudinal axis and where the cushioning positioner 10 has been removed form the car seat and is located on a flat horizontal surface. The back support 24 is removably attached to the base 12 by Velcro-type fasteners or other suitable means, permitting the back support 24 to be swung away from the base 12 thereby disconnecting its top surface 242 from the base bottom 121. The back support 24 can remain connected to the base 12 at pivot point 243 or can be completely disconnected therefrom. The child can be placed in the cushioning positioner 10 and the head support 122, neck support 123, buttocks support 124 and legs support 125 will provide the appropriate support for those areas of the body. As the child grows, it may be preferable to completely remove the back support 24.

While particular embodiments of the invention have been described, those skilled in the art will recognize that many modifications are possible that will achieve the same goals by substantially the same system, device or method, and where those systems, devices or methods still fall within the true spirit and scope of the invention disclosed.

What is claimed is:

1. An insert for a car seat for preventing slouching of a child placed therein wherein the car seat includes a seat portion and a backrest provided with a pair of shoulder straps that are operative to extend over the child to releasably engage a safety buckle, said insert comprising:
   a cushioning positioner having a base section onto which a child is placed,
   a back support attached to said base section, and
   a restraint including an end portion releasably attached and pivotally secured to a pivot on said base section, said restraint, when pivoted away from said base section, allowing placement of the child onto said base section, said restraint, when pivoted toward said base section, engaging and restraining the child to prevent slouching of the child.

2. The insert according to claim 1, wherein said restraint includes a securing member extending from the end portion and terminating at right angles therefrom to form a tee bar configuration. length of the harness.

3. The insert according to claim 2, wherein said securing member has a harness latch plate for engaging the safety buckle and a harness adjuster for adjusting the overall length of the harness.

4. An insert for a car seat for preventing slouching of a child placed therein in a travel position, comprising:
   a cushioning positioner adapted to be interposed between a child and a car seat, said cushioning positioner having a base section adapted to engage the child and raised wall sections disposed on said base section and extending around a perimeter of said base section, and
   a back support associated with said base section and, when received in the car seat, conforming to the shape of the car seat, said back support including a lower plane and a top surface, said lower plane being adapted to be adjacent the car seat, said lower plane having a base angle, said top surface being adjacent said base section, said top surface having a cradle angle spaced apart from said base angle, said cradle angle being larger than said base angle to prevent slouching of the child,
   said back support being releasable from said base section.

5. An insert for a car seat for preventing slouching of a child placed therein wherein the car seat includes a seat portion and a backrest provided with a pair of shoulder straps that are operative to extend over the child to releasably engage a safety buckle, said insert comprising:
   a cushioning positioner having a base section onto which a child can be placed,
   a back support attached to said base section, and
   a restraint including an end portion releasably attached and pivotally secured to a pivot on said base section, said restraint, when pivoted away from said base section, allowing placement of the child onto said base section, said restraint, when pivoted toward said base section, for engaging and for restraining the child to prevent slouching of the child, said restraint including a pommel member for, when said restraint is pivoted toward said base section, extending between legs of a child and for providing cushioning support for the child.

6. An insert for a car seat for preventing slouching of a child placed therein wherein the car seat includes a seat portion and a backrest provided with a pair of shoulder straps that are operative to extend over the child to releasably engage a safety buckle, said insert comprising:
   a cushioning positioner having a base section onto which a child can be placed,
   a back support attached to said base section, and
   a restraint including an end portion releasably attached and pivotally secured to a pivot on said base section, said restraint, when pivoted away from said base section, allowing placement of the child onto said base section, said restraint, when pivoted toward said base section, for engaging and for restraining the child to prevent slouching of the child, said restraint including a harness safety buckle for engaging the shoulder straps on the car seat.

7. An insert for a car seat for preventing slouching of a child placed therein wherein the car seat includes a seat portion and a backrest provided with a pair of shoulder straps that are operative to extend over the child to releasably engage a safety buckle, said insert comprising:
   a cushioning positioner having a base section onto which a child can be placed,
   a back support attached to said base section, and
   a restraint including an end portion releasably attached and pivotally secured to a pivot on said base section, said restraint, when pivoted away from said base section, allowing placement of the child onto said base section, said restraint, when pivoted toward said base section, for engaging and for restraining the child to prevent slouching of the child, said restraint being for engaging a chest of the child to restrain the child when said restraint is pivoted toward said base section.

8. An insert for location in a child's car seat for preventing slouching of a child wherein the car seat includes a seat portion and a backrest provided with a pair of shoulder straps that are operative to extend over the child, said insert comprising:

a cushioning positioner having a base section for engaging the child and having a raised wall attached to a perimeter of said base section;

a back support associated with said cushioning positioner and protruding outward from said base section and for engaging the child's seat, said back support being for supporting the back of the child in a supine position, said raised wall having an integral extension for extending between legs of the child, and a safety harness attached to said extension of said raised wall and having a harness buckle for releasably engaging said pair of shoulder straps of said child's seat, said harness buckle and said shoulder straps, when engaged, restraining the child in the child's seat.

* * * * *